US008711887B2

(12) United States Patent
Kang et al.

(10) Patent No.: US 8,711,887 B2
(45) Date of Patent: Apr. 29, 2014

(54) SIGNAL PROCESSING APPARATUS, DISPLAY APPARATUS HAVING THE SAME, AND SIGNAL PROCESSING METHOD

(75) Inventors: Hee-beom Kang, Suwon-si (KR); Suk-in Min, Anyang-si (KR); Choon-sik Jung, Hwaseong-si (KR); Hyeong-gil Kim, Suwon-si (KR); Cheul-hee Hahm, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 26 days.

(21) Appl. No.: 13/615,964

(22) Filed: Sep. 14, 2012

(65) Prior Publication Data

US 2013/0169868 A1 Jul. 4, 2013

(30) Foreign Application Priority Data

Dec. 28, 2011 (KR) ........................ 10-2011-0145188

(51) Int. Cl.
*H04J 3/04* (2006.01)
*G06F 13/00* (2006.01)

(52) U.S. Cl.
USPC ............. 370/535; 348/500; 710/65; 710/316; 375/354

(58) Field of Classification Search
USPC ............. 370/535; 348/500; 710/65, 316–317; 375/354
See application file for complete search history.

(56) References Cited

U.S. PATENT DOCUMENTS

| | | | | | |
|---|---|---|---|---|---|
| 4,558,445 | A * | 12/1985 | Novick | 370/535 |
| 4,821,296 | A * | 4/1989 | Cordell | 375/374 |
| 5,448,705 | A * | 9/1995 | Nguyen et al. | 712/244 |
| 5,928,378 | A * | 7/1999 | Choi | 714/795 |
| 7,102,629 | B2 | 9/2006 | Bae et al. | |
| 7,161,998 | B2 * | 1/2007 | Bodenschatz | 375/354 |
| 7,653,092 | B2 * | 1/2010 | Bang et al. | 370/503 |
| 7,735,028 | B2 * | 6/2010 | Soejima et al. | 716/104 |
| 7,773,638 | B2 * | 8/2010 | Tomizawa | 370/517 |
| 2002/0005841 | A1 | 1/2002 | Jung et al. | |
| 2008/0151781 | A1 * | 6/2008 | Li et al. | 370/254 |
| 2009/0259878 | A1 * | 10/2009 | Remlin et al. | 713/600 |
| 2010/0002144 | A1 * | 1/2010 | Choi | 348/572 |
| 2010/0042899 | A1 * | 2/2010 | Pu et al. | 714/763 |
| 2013/0229404 | A1 * | 9/2013 | Ishida et al. | 345/212 |

OTHER PUBLICATIONS

Communication, dated Apr. 3, 2013, issued by the European Patent Office in counterpart European Patent Application No. 12188222.9.

* cited by examiner

*Primary Examiner* — Christopher Shin
(74) *Attorney, Agent, or Firm* — Sughrue Mion, PLLC

(57) ABSTRACT

A display apparatus is provided. The display apparatus includes a receiver configured to receive transmission streams and output a first number of transmission stream signals; a first signal processor configured to receive the first number of transmission stream signals in parallel, group the received transmission stream signals according to kinds thereof, and output a second number of transmission stream signals, the second number being less than the first number; a second signal processor configured to receive the second number of transmission stream signals output from the first signal processor, restore the received transmission stream signals into the first number of transmission stream signals, and form output data using the restored transmission stream signals; and an output configured to output the output data formed in the second signal processor.

16 Claims, 7 Drawing Sheets

SIGNAL PROCESSING APPARATUS, DISPLAY APPARATUS HAVING THE SAME, AND SIGNAL PROCESSING METHOD

CROSS-REFERENCE TO RELATED APPLICATION

This application claims priority from Korean Patent Application No. 10-2011-0145188, filed on Dec. 28, 2011, in the Korean Intellectual Property Office, the disclosure of which is herein incorporated by reference in its entirety.

BACKGROUND

1. Field

Apparatuses and methods consistent with exemplary embodiments relate to a signal processing apparatus, a display apparatus having the same, a signal processing method, and more particularly, to a signal processing apparatus, a display apparatus having the same, and a signal processing method which are capable of transmitting transmission stream signals input in parallel.

2. Description of the Related Art

Display apparatuses perform image processing on a digital or analog image signal received from the outside, or on various image signals stored in a storage device therein in compressed files of various formats, and display the signal processed images.

Upon receiving the image signal from outside (that is, a transmission stream signal), the display apparatus communicates the image signal between internal components (for example, control cores and image processing chips) therein and processes the image signal. However, since the display apparatuses receive the transmission streams through pins in parallel, the display apparatuses have many disadvantages in terms of the number of pins.

SUMMARY

One or more exemplary embodiments may overcome the above disadvantages and other disadvantages not described above. However, it is understood that one or more exemplary embodiment are not required to overcome the disadvantages described above, and may not overcome any of the disadvantages described above.

It is an aspect of the present inventive concept to provide a signal processing apparatus, a display apparatus having the same, and a signal processing method which are capable of transmitting transmission stream signals input from a larger number of pins in parallel through a smaller number of pins.

According to an aspect of an exemplary embodiment, there is provided a display apparatus. The display apparatus may include: a receiver configured to receive transmission streams and output a first number of transmission stream signals; a first signal processor configured to receive the first number of transmission stream signals in parallel, groups the received transmission stream signals according to kinds thereof, and output a second number of transmission stream signals, the second number being less than the first number; a second signal processor configured to receive transmission stream signals output from the first signal processor, restore the received transmission stream signals into the first number of transmission stream signals, and form output data using the restored transmission stream signals; and an output configured to output the output data formed in the second signal processor.

The transmission streams may include a clock signal, a synchronous signal, a valid signal, and eight data signals. The first signal processor may group one of the synchronous signal and the valid signal into a first group signal and the eight data signals into second to fifth group signals, and output the clock signal, the first group signal, and the second to fifth group signals.

The first signal processor may, using a half-cycle clock having a cycle corresponding to a half-cycle of an internal clock of the display apparatus, output the synchronous signal as the first group signal and four data signals among the eight data signals as the second to fifth group signals in odd clocks of the half-clock clock, and output the valid signal as the first group signal and remaining four data signals among the eight data signals as the second to fifth group signals in even clocks of the half-cycle clock.

The first signal processor may synchronize the first number of transmission stream signals with the internal clock of the display apparatus, and output the synchronized first number of transmission stream signals as the second number of transmission stream signals.

The second signal processor may restore the transmission stream signals output from the first signal processor into the first number of transmission stream signals based on the clock signal in the transmission stream signals output from the first signal processor.

The second signal processor may restore the first group signal transmitted in odd clocks of a half-cycle clock having a cycle corresponding to a half-cycle of an internal clock of the display apparatus into the synchronous signal, restore the first group signal transmitted in even clocks of the half-cycle clock into the valid signal, and restore the second to fifth group signals transmitted in the odd clocks and even clocks of the half-cycle clock into the eight data signals.

According to another aspect of an exemplary embodiment, there is provided a signal processing apparatus. The signal processing apparatus may include: an input configured to receive a first number of transmission stream signals in parallel; and a multiplexer configured to group the first number of transmission stream signals according to kinds thereof, and output a second number of transmission stream signals, the second number being less than the first number.

The transmission stream signals may include a clock signal, a synchronous signal, a valid signal, and eight data signals. The multiplexer may group the synchronous signal and the valid signal into one first group signal, group the eight data signals into second to fifth group signals, and output the clock signal, the first group signal, and the second to fifth group signals.

The transmission stream signals may be a broadcasting signal for a digital broadcasting service.

The multiplexer may, using a half-cycle clock having a cycle corresponding to a half-cycle of an internal clock of the signal processing apparatus, output the synchronous signal as the first group signal and four data signals among the eight data signals as the second to fifth group signals in odd clocks of the half-clock clock, and output the valid signal as the first group signal and remaining four data signals among the eight data signals as the second to fifth group signals in even clocks of the half-cycle clock.

The multiplexer may synchronize the first number of transmission stream signals with the internal clock of the signal processing apparatus, and output the synchronized first number of transmission stream signals as the second number of the transmission stream signals.

According to another aspect of an exemplary embodiment, there is provided a signal processing method. The method may include receiving a first number of transmission stream signals in parallel; generating a second number of transmission stream signals by grouping the first number of transmission stream signals according to kinds thereof; and outputting the generated second number of transmission stream signals, wherein the second number is less than the first number.

The transmission stream signals may include a clock signal, a synchronous signal, a valid signal, and eight data signals. The generating a second number of transmission stream signals may include grouping the synchronous signal and the valid signal into one first group signal, grouping the eight data signals into second to fifth group signals, and generating the clock signal, the first group signal, and the second to fifth group signals as the second number of transmission stream signals.

The transmission stream signals may be a broadcasting signal for a digital broadcasting service.

The generating the second number of transmission stream signals may include, using a half-cycle clock having a cycle corresponding to a half-cycle of an internal clock of a signal processing apparatus, outputting the synchronous signal as the first group signal and four data signals among the eight data signals as the second to fifth group signals in odd clocks of the half-clock clock and outputting the valid signal as the first group signal and remaining four data signals among the eight data signals as the second to fifth group signals in even clocks of the half-cycle clock.

The generating the second number of transmission stream signals may include synchronizing the first number of transmission stream signals with the internal clock of the signal processing apparatus, and generating the synchronized first number of transmission stream signals as the second number of the transmission stream signal.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION

Figure 1:
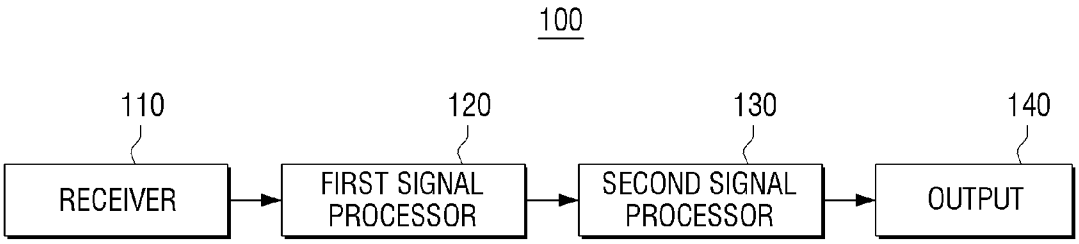
FIG. 1 is a block diagram illustrating a schematic configuration of a display apparatus according to an exemplary embodiment.

Hereinafter, exemplary embodiments will be described in more detail with reference to the accompanying drawings.

In the following description, same reference numerals are used for the same elements when they are depicted in different drawings. The matters defined in the description, such as a detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a block diagram illustrating a schematic configuration of a display apparatus according to an exemplary embodiment.

Referring to FIG. 1, a display apparatus 100 according to an exemplary embodiment may include a receiver 110, a first signal processor 120, a second signal processor 130, and an output 140.

The receiver 110 receives transmission streams and outputs a first number of transmission stream signals. Specifically, the receiver 110 may receive the transmission streams from a broadcasting station or a satellite in a wired or wireless manner, and modulate the received transmission streams to generate the first number of transmission stream signals. Alternatively, the receiver 110 may receive the transmission streams received through an external broadcasting reception apparatus (for example, settop box, dedicated broadcast receiver, or the like), and modulate the transmission streams to generate the first number of transmission stream signals. Here, the transmission stream signals may be a broadcasting signal for a digital broadcasting service or an image signal for content reproduction. The transmission stream signals may include a clock signal TS_CLK, a synchronous signal TS_SYNC, a valid signal TS_VALID, and eight data signals TS_DATA [7:0]. However, this is only an example, and the number of transmission stream signals may be more or less than eleven (11) signals. Moreover, the type of signals are not particularly limited. For example, signals other than a clock, synchronous, valid, and/or data signals may be used.

The first signal processor 120 receives the first number of transmission stream signals in parallel, groups the transmission stream signals according to kinds thereof, and outputs a second number of transmission stream signals, where the second number of transmission stream signals is less than the first number of transmission stream signals. Specifically, the first signal processor 120 may group the synchronous signal TS_SYNC and the valid signal TS_VALID received through the receiver 110 into a first group signal TS_SYNC/VALID, group the eight data signals TS_DATA [7:0] received through the receiver 110 into second to fifth group signals TS_DATA2 [3:0], and output the second number of transmission stream signals including the clock signal TS_CLK, the first group signal TS_SYNC/VALID, and the second to fifth group signals TS_DATA2 [3:0]. A detailed configuration and operation of the first signal processor 120 will be described later with reference to FIG. 4.

The second signal processor 130 receives the transmission stream signals output from the first signal processor 120, restores the received transmission signals into the first number of transmission stream signals, and forms an output data using the restored transmission stream signals. A detailed configuration and operation of the second signal processor 130 will be described later with reference to FIG. 5.

The output 140 outputs the output data formed in the second signal processor 130. Specifically, the output 140 may provide the output data formed in the second signal processor 130, that is, the first number of transmission stream signals to components embedded in the display apparatus 100.

Although it has illustrated that the second signal processor 130 is configured separately from the output 140 in FIG. 1, the second signal processor 130 and the output 140 may implemented to be integrally configured as one component.

Figure 2:
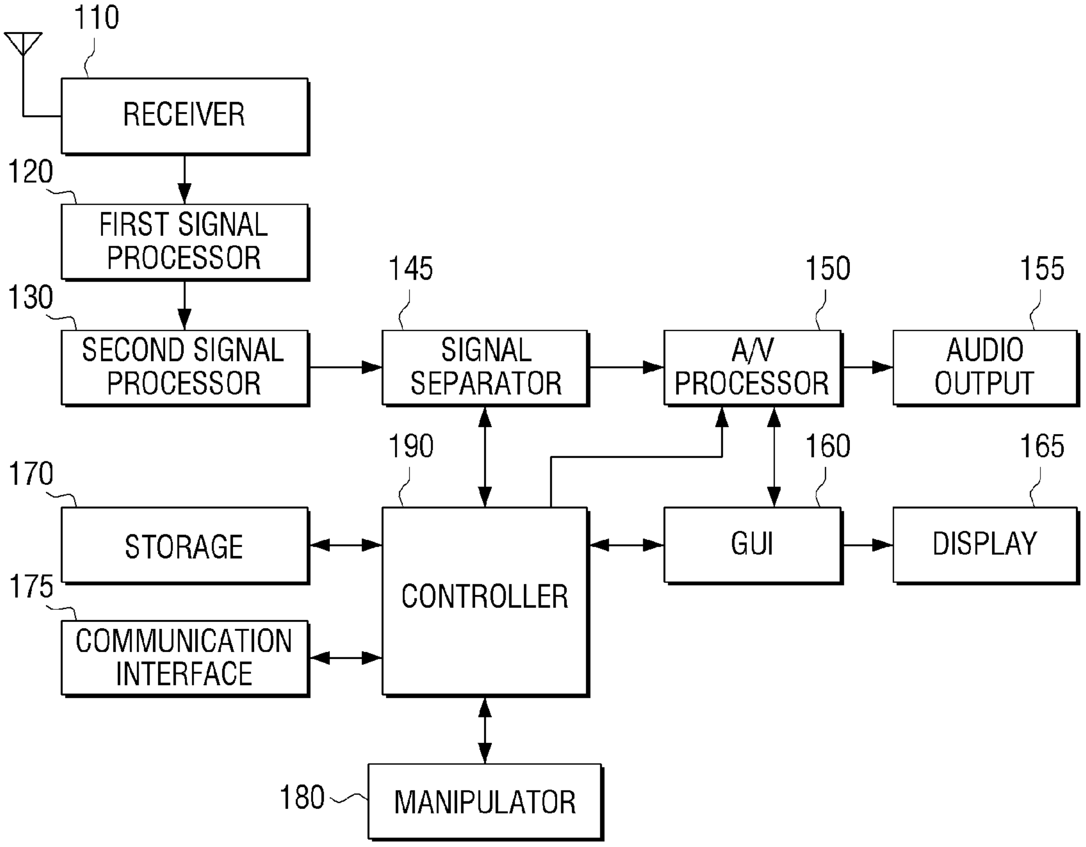
FIG. 2 is a block diagram illustrating a detailed configuration of a display apparatus according to an exemplary embodiment.

Although only the schematic configuration of the display apparatus 100 has been described above, the display apparatus 100 may have a configuration as illustrated in FIG. 2. A detailed configuration of the display apparatus 100 will be described below with reference to FIG. 2.

FIG. 2 is a block diagram illustrating a detailed configuration of a display apparatus 100 according to an exemplary embodiment.

Referring to FIG. 2, the display apparatus according to the exemplary embodiment may include a receiver 110, a first signal processor 120, a second signal processor 130, a signal separator 145, an audio/video (A/V) processor 150, an audio output 155, a graphic user interface (GUI) 160, a display 165, a storage 170, a communication interface 175, a manipulator 180, and a controller 190.

The receiver 110 receives broadcasting from a broadcasting station or a satellite in a wired or wireless manner, and modulates the received broadcasting. Specifically, the receiver 110 may receive transmission streams from a broadcasting station or a satellite in a wired or wireless manner to generate a first number of transmission stream signals. The transmission stream signals may include a clock signal TS_CLK, a synchronous signal TS_SYNC, a valid signal TS_VALID, and eight data signals TS_DATA [7:0]. However, this is only an example, and the number of transmission stream signals may be more or less than eleven (11) signals. Moreover, the type of signals are not particularly limited. For example, signals other than a clock, synchronous, valid, and/or data signals may be used.

Operations of the first signal processor 120 and the second signal processor 130 may be the same as those of FIG. 1 and thus repeated description thereof will be omitted.

The signal separator 145 separates a broadcasting signal (that is, the transmission stream signal) into a video signal, an audio signal and an additional information signal. Specifically, the signal separator 145 may separate the video signal, audio signal, and additional information signal from eleven transmission stream signals transmitted through the second signal processor 130. Then, the signal separator 145 transmits the video signal and the audio signal to the A/V processor 150.

The A/V processor 150 performs signal processing such as video decoding, video scaling, and/or audio decoding with respect to the video signal and audio signal input from the signal separator 145. The A/V processor 150 may also use the storage 170 in as the A/V processor 150 performs the A/V processing. The A/V processor 150 outputs the video signal to the GUI 160 and the audio signal to the audio output 155.

The received video signal and audio signal may be stored in the storage 170. When the received video signal and audio signal are stored in the storage 170, the A/V processor 150 may output video and audio to the storage 170 in a compressed form.

The audio output 155 converts the audio signal output from the A/V processor 150 into sound and outputs the sound through a speaker (not shown), headphones (not shown), or through an external apparatus connected thereto through an external output terminal (not shown). The audio output 155 may output the audio signal by wired or wireless method.

The GUI 160 generates a graphic user interface (GUI) to be provided to a user. The GUI 160 adds the generated GUI to the video signal output from the A/V processor 150. The display 165 displays a GUI-added image.

The storage 170 may store image contents. Specifically, the storage 170 may receive and store the image contents in which the video and audio are compressed from the A/V processor 150 and output the image contents stored according to control of the controller 190 to the A/V processor 150. The storage 170 may be implemented with a hard disc, a nonvolatile memory, a volatile memory, and the like.

The manipulator 180 may be implemented with a touch screen, a touch pad, a key button, a mouse, a joystick, a keyboard, or a key pad and provide user manipulation of a display. Specifically, the user may control the operation of the display apparatus 100 using the manipulator 180.

The controller 190 controls an overall operation of the display apparatus 100. Specifically, the controller 190 may control the A/V processor 150, the GUI 160, and the display 165 to display an image according to a control command received through the manipulator 180.

As described above, the display apparatus 100 according to an exemplary embodiment may transmit and receive the transmission stream signals input from eleven pins in parallel to/from any component embedded in the display apparatus through six pins and thus reduce the number of pins. It should be noted that eleven and six pins are an example, and that the inventive concept is not particularly limited to a specific number of pins, as long as the number of input pins is more than the number of output pins.

Although it has illustrated and described in FIG. 2 that the above-described function is applied to only the display apparatus which receives and displays a broadcasting signal, other types of signals are contemplated. The display apparatus described above, and a signal processing apparatus and a signal processing method which will be described later may be applied to any display apparatus capable of displaying an image.

It has illustrated and described with respect to FIG. 2 that the first signal processor 120 and the second signal processor 130 are arranged only between the receiver 110 and the signal separator 145. However, the first signal processor 120 and the second signal processor 130 may be implemented to be arranged between the communication interface 175 and the controller 190 or between the A/V processor 150 and the controller 190. That is, the first signal processor 120 and the second signal processor 130 may be implemented to be arranged between components which transmit/receive the transmission stream signals using, for example, the eleven pins.

It has been described that the first signal processor 120 and the second signal processor 130 are configured to be included in the display apparatus 100. However, the first signal processor 120 and the second signal processor 130 may be configured to be separated from the display apparatus. Detailed description thereof will be made later with reference to FIGS. 4 and 5.

Although it has been described that the first signal processor 120 and the second signal processor 130 are configured to be provided separately in the display apparatus, the first signal processor 120 and the second signal processor 130 may be combined with the other components of FIG. 2. Detailed description thereof will be described below with reference to FIG. 3.

Figure 3:
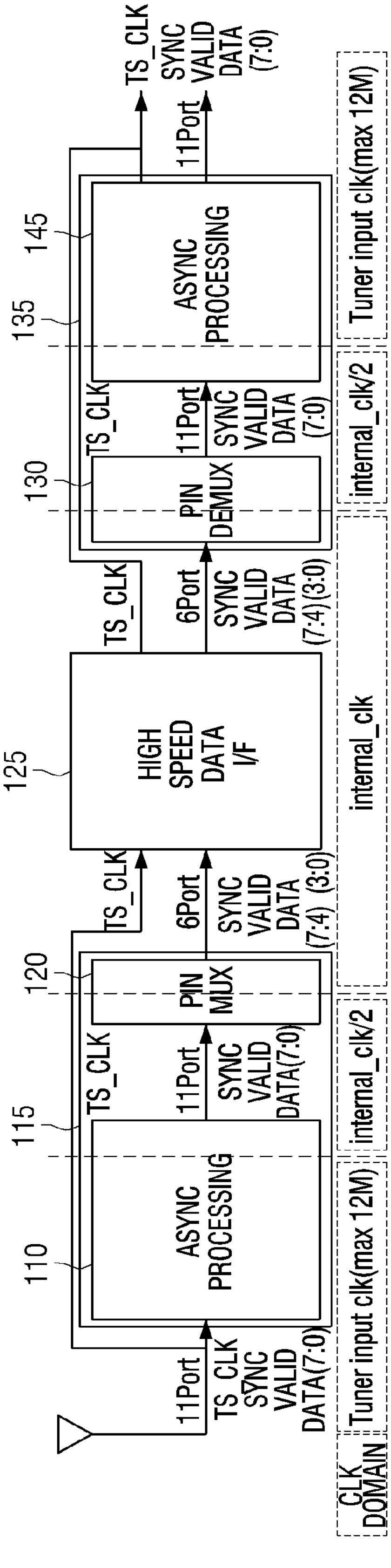
FIG. 3 is a view illustrating an operation in a case in which each of a first signal processor and a second signal processor of FIG. 1 is included in other components of the display apparatus of FIG. 1.

FIG. 3 is a view illustrating an exemplary embodiment in which each of the first signal processor 120 and the second signal processor 130 of FIG. 1 is included in the other components in the display apparatus.

Referring to FIG. 3, a transmission module 115 receives broadcasting from a broadcasting station or a satellite in a wired or wireless manner, demodulates the received broadcasting, and outputs six transmission stream signals. Specifically, the transmission module 115 may include a receiver 110 and a first signal processor 120. Here, the receiver 110 performs the same functions as the receiver 110 of FIG. 2 and the repeated description will be omitted. The first signal processor 120 may perform asynchronous processing.

The first signal processor 120 generates six transmission stream signals using eleven transmission stream signals. However, as indicated above, this is only an example. Specifically, the first signal processor 120 may allow the eleven transmission stream signals received through the receiver 110 to be synchronized with an internal clock signal of the display apparatus 100, group the synchronous signal TS_SYNC and the valid signal TS_VALID among the synchronized eleven transmission stream signals into one group signal TS_SYNC/VALID, group the eight data signals TS_DATA [7:0] into four group signals TS_DATA2 [3:0], and generate the six transmission stream signals including the clock signal TS_CLK, and five group signals TS_SYNC/VALID and TS_DATA2 [3:0]. The first signal processor 120 outputs the generated six transmission stream signals.

A high-speed interface 125 transmits the six transmission stream signals output from the transmission module 115 to the reception module 135 in parallel.

The reception module 135 performs signal processing on the input transmission stream signals. Specifically, the reception module 135 may include a second signal processor 130 and a signal separator 145. The signal separator 145 may perform asynchronous processing.

The second signal processor 130 restores the received six transmission stream signals into the eleven transmission stream signals. Specifically, the signal processor 130 may restore the first group signal TS_SYNC/VALID into the synchronous signal TS_SYNC and the valid signal TS_VALID, and restore the second to fifth group signals TS_DATA2 [3:0] into the eight data signals TS_DATA [7:0] based on the clock signal TS_CLK in the received 6 transmission stream signals. The signal processor 130 provides the restored eleven transmission stream signals to the signal separator 145.

The signal processor 145 may separate a video signal, an audio signal, and an additional information signal using the received eleven transmission stream signals.

In FIG. 3, although only the example in which the first signal processor 120 is included in the receiver 110 of FIG. 2 and the second signal processor 130 is included in the signal separator 145 of FIG. 2 has been illustrated and described, it may be implemented that the first signal processor 120 may be included in a configuration in which the transmission stream signals are transmitted through eleven pins in the display apparatus 100 and the second signal processor 130 may be included in the configuration in which the transmission stream signals are received through the eleven pins in the display apparatus 100.

Figure 4:
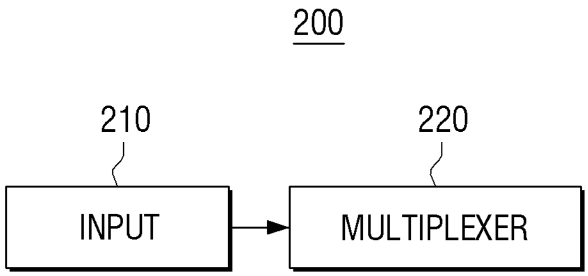
FIG. 4 is a view illustrating a detailed configuration of a signal processor corresponding to a first signal processor of FIG. 1.

FIG. 4 is a view illustrating a detailed configuration of a signal processing apparatus corresponding to the first signal processor 120 of FIG. 1.

Referring to FIG. 4, a signal processing apparatus 200 includes an input 210 and a multiplexer 220.

The input 210 receives a first number of transmission stream signals in parallel. Specifically, the input 210 receives eleven transmission stream signals including a clock signal TS_CLK, a synchronous signal TS_SYNC, a valid signal TS_VALID, and eight data signals TS_DATA [7:0] in parallel. However, as described above, the number and type of signals may be different.

The multiplexer 220 groups the first number of transmission stream signals according to kinds thereof to output a second number of transmission stream signals that is less than the first number. Specifically, the multiplexer 220 may group the synchronous signal TS_SYNC and the valid signal TS_VALID into one first group signal TS_SYNC/VALID, group the eight data signals TS_DATA [7:0] into second to fifth group signals TS_DATA2 [3:0], and generate six transmission stream signals including the clock signal TS_CLK, and the first group signals TS_SYNC/VALID and the second to fifth group signals TS_DATA2 [3:0].

The detailed operation of the multiplexer 220 will be described below with reference to FIGS. 6 and 7.

Figure 6:
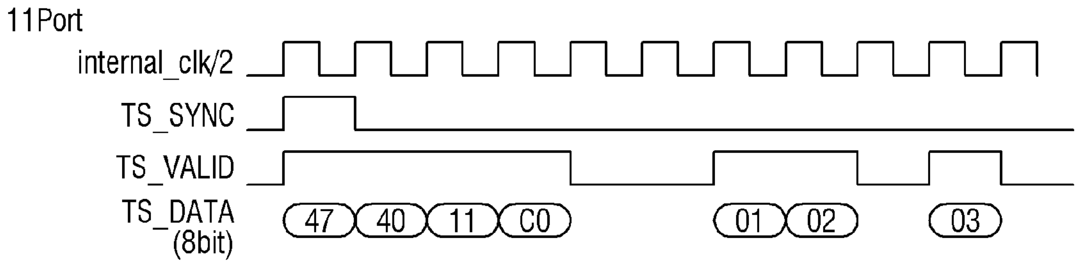
FIGS. 6 and 7 are waveform diagrams explaining an operation of a multiplexer of FIG. 4.
Figure 7:
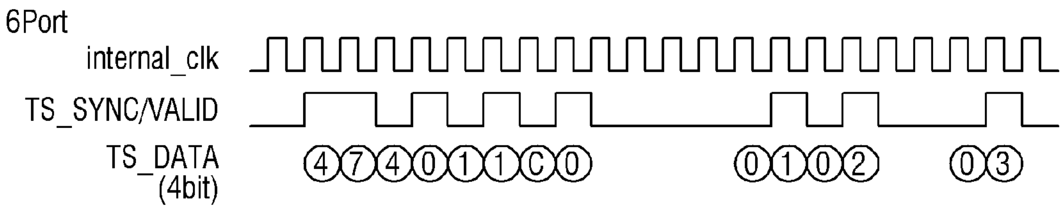

Referring to FIGS. 6 and 7, the multiplexer 220 synchronizes eleven transmission stream signals input through the input with an internal clock signal of the signal processing apparatus 200. FIG. 6 illustrates an example of a waveform diagram with respect to the synchronous signal TS_SYNC, the valid signal TS_VALID, and the eight data signals TS_DATA [7:0] among the eleven transmission stream signals synchronized with the internal clock.

When the eleven transmission stream signals are synchronized with the internal clock, the multiplexer 220 may output the synchronous signal as the first group signal TS_SYNC/VALID and upper four data signals TS_DATA [3:0] among the eight data signals TS_DATA [7:0] as the second to fifth group signals TS_DATA2 [3:0] in odd clocks of a half-cycle clock using the half-cycle clock having a cycle corresponding to a half-cycle of the internal clock of the signal processor 200. Further, the multiplexer 220 may output the valid signal (TS_VALID) as the first group signal TS_SYNC/VALID and remaining four data signal TS_DATA [7:4] as the second to fifth group signals TS_DATA2 [3:0] in even clocks of the half-cycle. FIG. 7 illustrates an example of a waveform diagram of the grouped first to fifth group signals.

An example has been described above in which the synchronous signal TS_SYNC and the upper four data signals TS_DATA [3:0] are transmitted in odd clocks and the valid signal TS_VALID and the lower data signal TS_DATA [7:4] are transmitted in even clocks in the exemplary embodiment. Alternately, it may be implemented that the synchronous signal TS_SYNC and the upper four data signals TS_DATA [3:0] are transmitted in even clocks and the valid signal TS_VALID and the lower data signal TS_DATA [7:4] are transmitted in odd clocks. In addition, when grouping the eight data signals TS_DATA [7:0], although it has been described that the upper four bits and lower four bits are divided and transmitted, it may be implemented that odd-bit data signals are transmitted in odd clocks and even-bit data signals are transmitted in even clocks, or vice versa.

Figure 5:
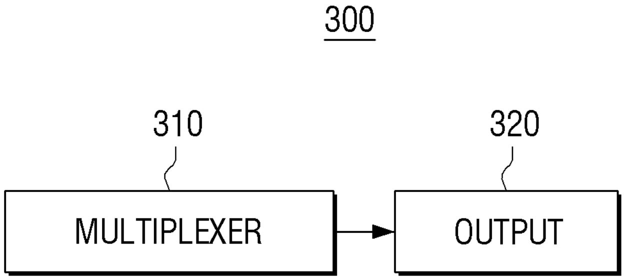
FIG. 5 is a view illustrating a detailed configuration of a signal processor corresponding to a second signal processor of FIG. 1.

FIG. 5 is a view illustrating a detailed configuration of a signal processing apparatus corresponding to the second signal processor 130 of FIG. 1.

Referring to FIG. 5, a signal processing apparatus 300 includes a demultiplexer 310 and the output 320.

The demultiplexer 310 may receive six transmission stream signals including the clock signal TS_CLK, the first to fifth group signals TS_SYNC/VALID, TS_DATA2 [3:0], restore the received first group signal TS_SYNC/VALID into the synchronous signal TS_SYNC and the valid signal TS_VALID, and restore the received second to fifth group signals TS_DATA2 [3:0] into the eight data signals TS_DATA [7:0].

The detailed operation of the demultiplexer 310 will be described below with reference to FIGS. 8 and 9.

Figure 8:
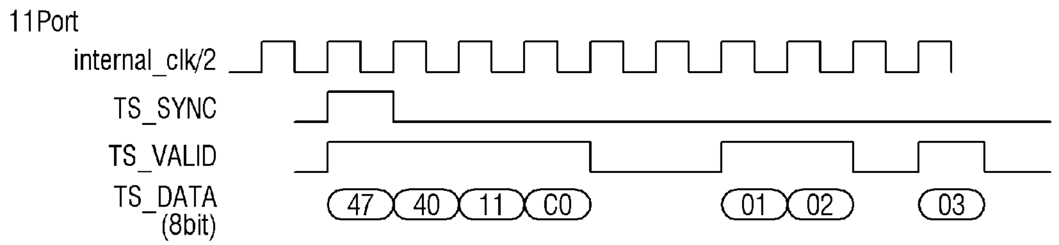
FIGS. 8 and 9 are waveform diagrams explaining an operation of a demultiplexer of FIG. 4.
Figure 9:
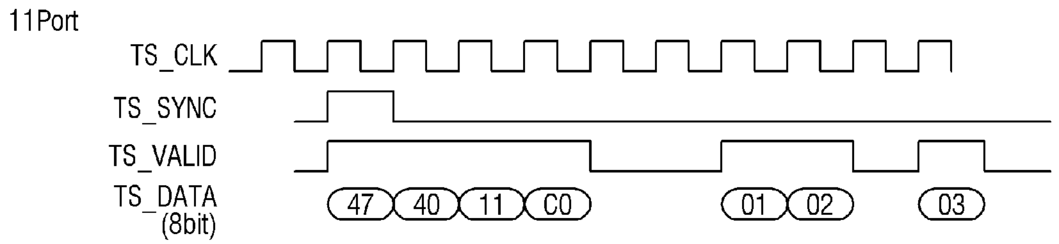

Referring to FIGS. 8 and 9, the demultiplexer 310 may receive the six transmission stream signals as shown in FIG. 7, restore the first group signal TS_SYNC/VALID transmitted in the odd clocks of the half-cycle clock having a cycle corresponding to the half-cycle of the internal clock of the signal processing apparatus into the synchronous signal TS_SYNC and restore the first group signal TS_SYNC/VALID transmitted in the even clocks of the half-cycle clock as the valid signal TS_VALID, based on the clock signal TS_CLK in the six transmission stream signals. The demultiplexer 310 may restore the second to fifth group signals TS_DATA2 [3:0] transmitted in the odd clocks and the even clocks of the half-cycle clock into the eight data signals TS_DATA [7:0]. Thus, an example of the waveform diagram of the restored synchronous signal TS_SYNC, valid signal TS_VALID, and eight data signals TS_DATA [7:0] is illustrated in FIG. 8.

The demultiplexer 310 outputs the clock signal TS_CLK in the six transmission stream signals and the restored synchronous signal TS_SYNC, valid signal TS_VALID, and eight data signals TS_DATA [7:0] to the output 320. FIG. 9 illustrates a waveform diagram of the eleven transmission stream signals restored in the demultiplexer 310 and finally output.

The output 320 may be provided in a configuration (for example, the signal separator 145 of FIG. 2) in which the eleven transmission stream signals restored in the demultiplexer 310 are signal-processed.

Figure 10:
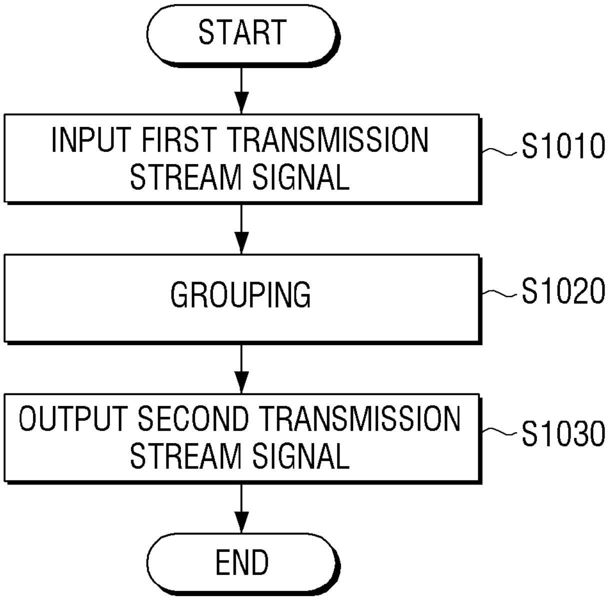
FIG. 10 is a flowchart illustrating a signal processing method according to an exemplary embodiment.

FIG. 10 is a flowchart illustrating a signal processing method in a transmission side in an exemplary embodiment.

Referring to FIG. 10, a first transmission stream signal is input (S1010). For example, a first number of transmission stream signals are received in parallel. Specifically, eleven transmission stream signals including a clock signal TS_CLK, a synchronous signal TS_SYNC, a valid signal TS_VALID, and eight data signals TS_DATA [7:0] are received in parallel.

Grouping is performed (S1020). For example, the first number of transmission stream signals are grouped according to kinds thereof to generate a second number of transmission stream signals less than the first number. Specifically, the input eleven transmission stream signals are synchronized with an internal clock of the signal processing apparatus. Using a half-cycle clock having a cycle corresponding to a half-cycle of the internal clock of the signal processing apparatus (or display apparatus), the synchronous signal TS_SYNC is output as the first group signal TS_SYNC/VALID and upper four data signals TS_DATA [3:0] among the eight data signals TS_DATA [7:0] are output as the second to fifth group signals TS_DATA2 [3:0] in odd clocks of the half-cycle clock. In the even clocks of the half-cycle clock, the valid signal TS_VALID is output as the first group signal TS_SYNC/VALID and the remaining four data signals TS_DATA [7:4] are output as the second to fifth group signals TS_DATA2 [3:0].

The second transmission stream signal is output (S1030). For example, the generated second number of transmission stream signals is output. Specifically, six transmission stream signals including the clock signal TS_CLK and the first to fifth group signals TS_SYNC/VALID and TS_DATA2 [3:0] may be output.

Therefore, the signal processing method according to this exemplary embodiment can transmit the transmission stream signals input from the eleven pins in parallel to each component in the display apparatus through 6 pins and thus the number of pins can be reduced. The signal processing method of FIG. 10 can be executed by the signal processing apparatus having the configuration of FIG. 4 or on other display apparatuses or signal processing apparatuses having other configurations.

Figure 11:
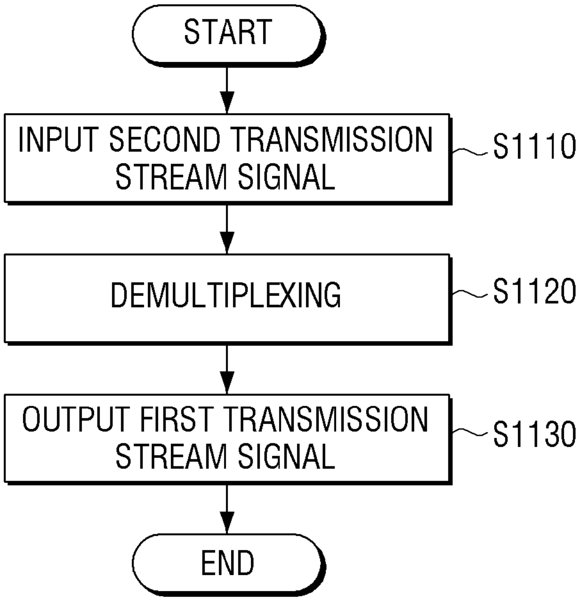
FIG. 11 is a flowchart illustrating a signal processing method according to another exemplary embodiment.

FIG. 11 is a flowchart illustrating a signal processing method in a transmission side in an exemplary embodiment.

Referring to FIG. 11, a second transmission stream signal is input (S1110). For example, a number of transmission stream signals are received in parallel. Specifically, six transmission stream signals including the clock signal TS_CLK and the first to fifth group signals TS_SYNC/VALID and TS_DATA2 [3:0] may be received.

The second transmission stream signal is demultiplexed (S1120). For example, the input second number of transmission stream signals are restored into a first number of transmission stream signals, in which the first number is more than the second number (S1120). Specifically, based on the clock signal TS_CLK in the six transmission stream signals, the first group signal TS_SYNC/VALID transmitted in odd clocks of a half-cycle clock having a cycle corresponding to a half-cycle of the internal clock of the signal processing apparatus (or display apparatus) may be restored into a synchronous signal TS_SYNC and the first group signal TS_SYNC/VALID transmitted in even clocks of the half-cycle clock may be restored into a valid signal TS_VALID. The second to fifth group signals TS_DATA2 [3:0] transmitted in the even clocks and the odd clocks of the half-cycle clock may be restored into eight data signal TS_DATA [7:0].

The first transmission stream signal is output (S 1130). For example, the restored first number of transmission stream signals are output. Specifically, the restored eleven transmission stream signals may be provided to a signal processing component (for example, signal separator 145 of FIG. 2).

Accordingly, the signal processing method according to exemplary embodiments can restore transmission stream signals transmitted through six pins into eleven transmission stream signals and thus the number of pins can be reduced without changing the configuration of the display apparatus 100. The signal processing method of FIG. 11 can be executed by the signal processing apparatus having the configuration of FIG. 5 or on other display apparatuses or signal processing apparatuses having other configurations.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:

a receiver configured to receive transmission streams and output a first number of transmission stream signals;

a first signal processor configured to receive the first number of transmission stream signals in parallel, group the received transmission stream signals according to kinds thereof, and output a second number of transmission stream signals, the second number being less than the first number;

a second signal processor configured to receive the second number of transmission stream signals output from the first signal processor, restore the received transmission stream signals into the first number of transmission stream signals, and form output data using the restored transmission stream signals; and an output configured to output the output data formed in the second signal processor, wherein the transmission streams comprise a clock signal, a synchronous signal, a valid signal, and eight data signals, and wherein the first signal processor groups one of the synchronous signal and the valid signal into a first group signal and the eight data signals into second to fifth group signals, and outputs the clock signal, the first group signal, and the second to fifth group signals.

2. The display apparatus as claimed in claim 1, wherein the first signal processor, using a half-cycle clock having a cycle corresponding to a half-cycle of an internal clock of the display apparatus, outputs the synchronous signal as the first group signal and four data signals among the eight data signals as the second to fifth group signals in odd clocks of the half-clock clock, and outputs the valid signal as the first group signal and remaining four data signals among the eight data signals as the second to fifth group signals in even clocks of the half-cycle clock.

3. The display apparatus as claimed in claim 2, wherein the first signal processor synchronizes the first number of transmission stream signals with the internal clock of the display apparatus, and outputs the synchronized first number of transmission stream signals as the second number of transmission stream signals.

4. The display apparatus as claimed in claim 1, wherein the second signal processor restores the transmission stream signals output from the first signal processor into the first number of transmission stream signals based on the clock signal in the transmission stream signals output from the first signal processor.

5. The display apparatus as claimed in claim 4, wherein the second signal processor restores the first group signal transmitted in odd clocks of a half-cycle clock having a cycle corresponding to a half-cycle of an internal clock of the display apparatus into the synchronous signal, restores the first group signal transmitted in even clocks of the half-cycle clock into the valid signal, and restores the second to fifth group signals transmitted in the odd clocks and even clocks of the half-cycle clock into the eight data signals.

6. A signal processing apparatus comprising:

an input configured to receive a first number of transmission stream signals in parallel; and a multiplexer configured to group the first number of transmission stream signals according to kinds thereof, and output a second number of transmission stream signals, the second number being less than the first number, wherein the transmission stream signals comprise a clock signal, a synchronous signal, a valid signal, and eight data signals, and wherein the multiplexer groups the synchronous signal and the valid signal into one first group signal, groups the eight data signals into second to fifth group signals, and outputs the clock signal, the first group signal, and the second to fifth group signals.

7. The signal processing apparatus of as claimed in claim 6, wherein the transmission stream signals are a broadcasting signal for a digital broadcasting service.

8. The signal processing apparatus as claimed in claim 6, wherein the multiplexer, using a half-cycle clock having a cycle corresponding to a half-cycle of an internal clock of the signal processing apparatus, outputs the synchronous signal as the first group signal and four data signals among the eight data signals as the second to fifth group signals in odd clocks of the half-clock clock, and outputs the valid signal as the first group signal and remaining four data signals among the eight data signals as the second to fifth group signals in even clocks of the half-cycle clock.

9. The signal processing apparatus as claimed in claim 8, wherein the multiplexer synchronizes the first number of transmission stream signals with the internal clock of the signal processing apparatus, and outputs the synchronized first number of transmission stream signals as the second number of the transmission stream signal.

10. A signal processing method comprising:

receiving a first number of transmission stream signals in parallel;

generating a second number of transmission stream signals by grouping the first number of transmission stream signals according to kinds thereof; and outputting the generated second number of transmission stream signals, wherein the second number is less than the first number, wherein the transmission stream signals comprise a clock signal, a synchronous signal, a valid signal, and eight data signals, and wherein the generating the second number of transmission stream signals comprises:

grouping the synchronous signal and the valid signal into one first group signal;

grouping the eight data signals into second to fifth group signals; and providing the clock signal, the first group signal, and the second to fifth group signals as the second number of transmission stream signals.

11. The method as claimed in claim 10, wherein the transmission stream signals are a broadcasting signal for a digital broadcasting service.

12. The method as claimed in claim 10, wherein generating the second number of transmission stream signals comprises using a half-cycle clock having a cycle corresponding to a half-cycle of an internal clock of a signal processing apparatus to:

output the synchronous signal as the first group signal and four data signals among the eight data signals as the second to fifth group signals in odd clocks of the half-clock clock; and output the valid signal as the first group signal and remaining four data signals among the eight data signals as the second to fifth group signals in even clocks of the half-cycle clock.

13. The method as claimed in claim 10, wherein generating the second number of transmission stream signals comprises:

synchronizing the first number of transmission stream signals with the internal clock of the signal processing apparatus; and providing the synchronized first number of transmission stream signals as the second number of the transmission stream signal.

14. A display apparatus comprising:

a first signal processor configured to group a plurality of transmission stream signals according to kinds thereof, and output the grouped signals on an internal high speed data interface of the display apparatus according to an internal clock of the display apparatus;

a second signal processor configured to receive the grouped signals from the internal high speed data interface of the display apparatus, restore the grouped signals into the plurality of transmission stream signals, and output the restored transmission stream signals, wherein a number of the transmission stream signals is greater than a number of the grouped signals, wherein the transmission stream signals comprise a clock signal, a synchronous signal, a valid signal, and eight data signals, and wherein the first signal processor groups one of the synchronous signal and the valid signal into a first group signal and the eight data signals into second to fifth group signals, and outputs the clock signal, the first group signal, and the second to fifth group signals to the internal high speed interface according to the internal clock.

15. The display apparatus as claimed in claim 14, wherein the first signal processor, using a half-cycle of the internal clock, outputs the synchronous signal as the first group signal and four data signals among the eight data signals as the second to fifth group signals in odd clocks of the half-clock clock, and outputs the valid signal as the first group signal and remaining four data signals among the eight data signals as the second to fifth group signals in even clocks of the half-cycle clock.

16. The display apparatus as claimed in claim 14, wherein the second signal processor restores the grouped signals into the plurality of transmission stream signals based on the clock signal in the grouped signals received from the internal high speed data interface.

* * * * *